March 20, 1956     E. H. SCHULTZ, JR     2,738,681
STEP PULLEY
Filed April 30, 1952
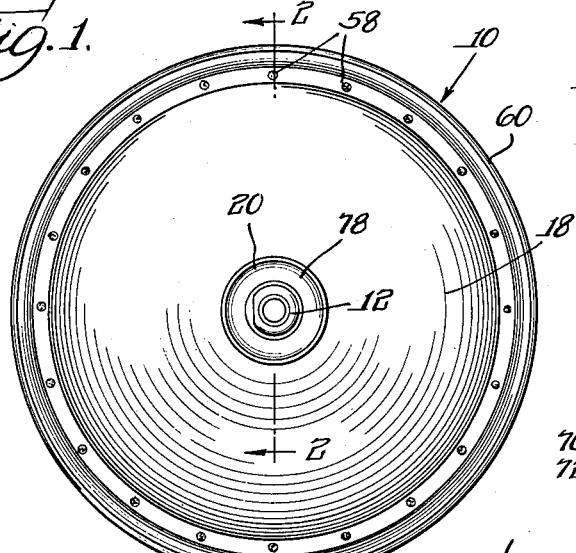
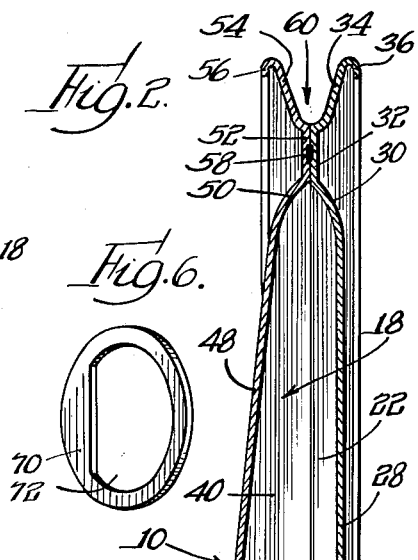
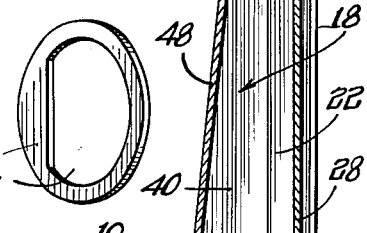
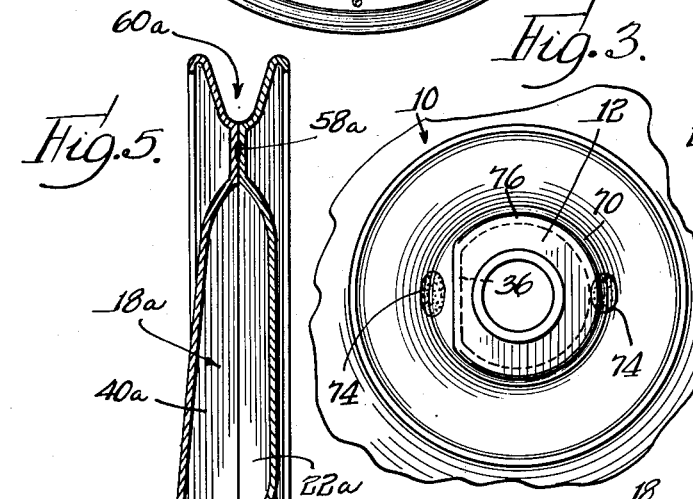
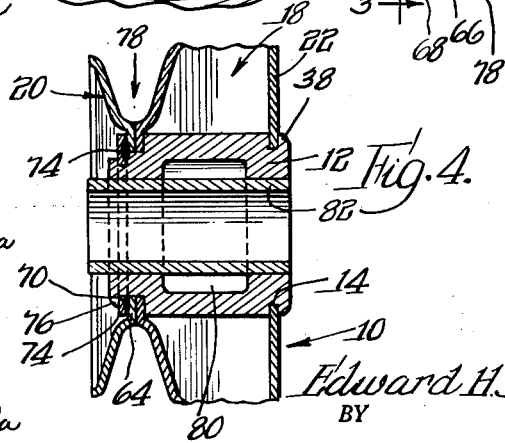
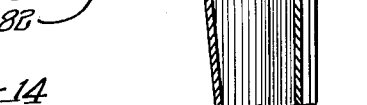
INVENTOR.
Edward H. Schultz, Jr.
BY
Moore, Olson & Trexler
attys.

United States Patent Office 2,738,681
Patented Mar. 20, 1956

2,738,681

STEP PULLEY

Edward H. Schultz, Jr., Chicago, Ill., assignor to The Nagel-Chase Manufacturing Company, Chicago, Ill., a corporation of Illinois Application April 30, 1952, Serial No. 285,118

10 Claims. (Cl. 74—230.3)

This invention is concerned generally with a sheave or pulley, particularly a two-groove or step sheave or pulley.

Two-step pulleys or sheaves for speed reduction are in common use and have been well known for many years. In the prior known construction of such two-step pulleys the smaller diameter groove generally is turned or otherwise formed in a tubular hub. The larger sheave is stamped from two sections of sheet metal which are secured together, generally by welding, and mounted on the hub spaced from the groove turned in the hub. The larger pulley generally is held on a reduced neck portion of the hub by means such as peening over the end of the neck portion. Relative rotation between the larger pulley and the hub, the larger pulley generally being the driving member, is precluded by a milled flat on the hub and a complementary flat edge on the central hole of the pulley—the pulley thus having a generally D-shaped central aperture.

Several defects are inherent in such construction. The foremost of these is failure in use due to shock loads that tear the center hole of the larger pulley to a circular configuration, thus allowing the larger pulley to rotate on the hub. In order to fix the larger pulley against axial motion on the hub, it has been necessary to place the two metal sheets of the larger pulley against one another to permit peening over the end of the hub. Consequent axial weakness of the larger diameter pulley has allowed side wobble or end run-out with accompanying noise, occasional untracking of belts, and sometimes permanent deformation of the pulley. Furthermore, the lathe turning of the smaller pulley groove has been time-consuming and expensive.

It is accordingly an object of the invention to provide a step pulley or sheave obviating all of the above noted difficulties.

More specifically, it is an object of the invention to provide a step pulley or sheave wherein adjacent pulleys or grooves have a common, integral force transmission member.

A further object of this invention is to provide a step sheave or pulley of great axial or end stability.

Yet another object of this invention is to provide a step sheave or pulley having all pulleys of sheet metal construction.

Other and further objects and advantages of the present invention will be apparent when taken in connection with the accompanying drawings wherein like numerals have been used to identify like parts throughout and in which:

Fig. 1 is an end view of a step sheave or pulley embodying the principles of the invention;

Fig. 2 is an axial sectional view taken along the line 2—2 in Fig. 1;

Fig. 3 is a detail view of an end construction of the pulley and taken substantially along the line 3—3 of Fig. 2;

Fig. 4 is a fragmentary axial sectional view of the pulley taken along the line 4—4 of Fig. 2;

Fig. 5 is a fragmentary view similar to Fig. 2 showing a modified form of the pulley; and Fig. 6 is a perspective view of a reenforcing washer having a substantially D-shaped center hole.

Referring first to Figs. 1–4 in the drawings, there will be seen a step pulley 10 having a central cylindrical base member or hub 12 having reduced outer end sections 14 and 16. A large pulley 18 and a small pulley 20 are fixed on the hub.

The large pulley 18 is stamped from two sections of sheet metal. The first section 22 is generally concave in configuration and extends outwardly from the end section 14 substantially planar at 24. An outwardly curved intermediate section 26 extends from the planar section 24 to a flat portion 28 which curves inwardly at 30 toward the outer edge of the pulley to a flat abutting or attaching section 32. The pulley section 32 then flares outwardly at 34 and is curled over to form a reversely bent edge flange 36.

The central hole of the sheet metal section 22 is substantially D-shaped in configuration and fits over the reduced end portion 14 of the hub 12, the hub 12 being provided with a flat 36 and thus being complementary in configuration to the central hole in the sheet metal section 22 to preclude relative rotation. The end of the hub is peened over at 38 to clamp the sheet metal section 22 thereon.

The larger pulley 18 is completed by, and the smaller pulley 20 is partially formed by, a sheet metal section 40 which is generally convex in outward appearance. The sheet metal section 40 includes a central flange 42 curving outwardly at 44 to a shoulder section 46. From the shoulder section 46 the sheet metal section 40 progressively approaches the sheet metal portion 22 to form a substantially frusto-conical portion 48 curving in at 50 to an abutting or attaching section 52 engaging the abutting or attaching section 32. The section 40 then flares outwardly at 54 and is curled over at 56 to form a reversely bent edge flange. The contacting abutting or attaching sections 32 and 52 are permanently secured together by a plurality of arcuately spaced spot welds 58, or by any other suitable or desirable means. The outwardly flaring sections 34 and 54 together form a substantially V-shaped pulley groove 60.

The smaller pulley 20 is completed by a sheet metal section 62 of relatively small diameter and has a central flange 64 and flares outwardly therefrom at 66 to an outwardly turned edge flange 68. The central apertures of the sections 40 and 62 are substantially D-shaped and complementary to the shape of the hub 12. These sections fit over the reduced end sections 16 and a reenforcing washer 70 (see also Fig. 6) having a substantially D-shaped center hole 72 likewise fits over the reduced end section 16. The reenforcing washer 70 is welded to the flange 64 as at 74 and the end of a hub is peened over at 76 to clamp the washer 70 and the flanges 64 and 42 of the two sheet metal sections 62 and 40 together on the hub. It will be understood that a similar reenforcing washer could be welded on the sheet metal section 22 if desired. The outwardly flared sections 44 and 66 coact to form a relatively small diameter V-shaped groove 78.

The hub 12 is provided with an annular groove 80 located substantially midway between the ends of the hub and forming an oil reservoir. A bearing sleeve 82 which preferably is of porous metal through which oil can seep from the reservoir 80 is press fitted or otherwise fixed in the central bore of the hub.

Since the sheet metal section 40 serves as part of the large pulley 18 including the V-shaped groove 60 therein and as part of the small pulley 20 including the V groove therein, a large proportion of the forces transmitted between the pulleys is transferred through this common, integral member with only a part of the forces being transferred through the hub 12. Forces tending to tear the central D holes in the pulleys into circular configuration therefore are relatively small.

In certain instances when it is desired to have a small pulley of larger diameter than that theretofore shown, the construction shown in Fig. 5 may be used. The construction in Fig. 5 is generally similar to that previously shown and described and includes a hub 12a having an oil reservoir 80a and a fitted bearing sleeve 82a. The large pulley 18a is provided with a sheet metal section 22a identical with that disclosed earlier and clamped in place by a peened over edge 38a of the hub, the hub again being provided with a flat and the section 22a having a substantially D-shaped center hole.

The remainder of the large pulley 18a is formed by a sheet metal section 40a secured as by spot welds 58a to the sheet metal 22a and forming therewith a substantially V-shaped belt receiving groove 60a. The section 40a is similar to the section 40 previously disclosed except that the central flange 42a has a considerably larger radial dimension. The small pulley 20a is completed by a sheet metal section 62a generally similar to the section 62 heretofore disclosed and having a reenforcing washer 70a welded thereto. A peened over end 76a clamps the washer and sheet metal sections 62a and 40a on the reduced end portion of the hub 12a. The essential difference between the sheet metal section 62a and the previously disclosed section 62 lies in the increased radial dimension of the flange 64a. To prevent spreading of the V-shaped groove 78a of the small pulley, the flanges 42a and 64a are secured together at arcuately spaced intervals by means such as spot welds 84a.

The provision of a single, integral member as a common part of the two pulleys of the step sheave or pulley disclosed herein avoids the slipping or tearing of force transmission members such as has occurred in the prior art. The use of this single member further allows spacing of the two sections of the large pulley at substantially opposite ends of the hub and this spacing imparts considerable axial stability to the pulley. A still further advantage of the step pulley disclosed herein is that the pulleys are formed of sheet metal which is readily stamped into shape, and the hub needs very little machining. The time consumed in manufacturing the step pulley and the cost thereof consequently are relatively little. It will be noted that the general concavity of the large pulley positions it toward one end of the hub to provide clearance for a belt on the small pulley.

Although two particular embodiments of this invention have been shown and described, it will be understood that these embodiments are by way of example and not of limitation. The invention includes all that which falls fairly within the spirit and scope of the appended claims.

I claim:

1. A step pulley including a rotatable base member, a first substantially circular sheet metal member on said base member and symmetric about the axis of rotation of said base member, a second substantially circular sheet metal member on said base member and symmetric about said axis of rotation, said sheet metal members contacting near their peripheries and flaring apart outwardly thereof to form a belt receiving groove, means for holding the contacting areas of said sheet metal members together, a third sheet metal member on said base member and symmetric about said axis, said third sheet metal member and one of said first two sheet metal members being in contact and flaring apart outwardly of the contacting areas to form a belt receiving groove, and means for holding the last mentioned contacting areas together, said one of the first two sheet metal members forming a common part of the two belt receiving grooves.

2. A step pulley comprising a rotatable base member; a first pulley on said base member and comprising a pair of substantially circular sheet metal members joined near their peripheries and diverging at their peripheries to form a belt accommodating portion, said pair of sheet metal members being spaced apart near their centers and mounted on said base member at spaced apart positions thereon; and a second pulley on said base member and comprising a pair of contacting sheet metal members joined to one another and diverging outwardly therefrom to form a belt accommodating portion, one of said sheet metal members of said first pulley and one of said sheet metal members of said second pulley being a common member.

3. A step pulley comprising a rotatable base member having a non-circular cross section and reduced end portions, a first pulley of sheet metal construction having a non-circular central aperture complementary to said base member and receiving said base member, said pulley fitting at least in part on both of said reduced end portions, and a second pulley of sheet metal construction having a non-circular central aperture complementary to said base member and receiving said base member, said second pulley fitting at least in part on at least one of said reduced end portions and the outer extremities of said end portions being peened over to secure said pulleys thereon, at least a part of said first and said second pulley including a common, integral sheet of metal.

4. A step pulley comprising a generally cylindrical central hub; a first pulley of relatively large diameter comprising a pair of sheet metal side plates fixed on said hub at spaced apart locations, said side plates converging radially and contacting near their outer peripheries, said side plates flaring outwardly to form a belt receiving groove outwardly of the contacting areas, means for securing the side plates together at said contacting areas, one of said side plates having an offset shoulder portion adjacent said hub; and a second pulley of relatively small diameter, said second pulley comprising a pair of side plates mounted on said hub, said side plates contacting at their inner edges and flaring outwardly therefrom to form a belt receiving groove, one of said last named pair of side plates comprising the one of said first mentioned pair of side plates having the offset shoulder portion inwardly of said shoulder portion, and means for holding the last named pair of side plates together inwardly of the belt receiving groove.

5. A step pulley as set forth in claim 4 wherein the first mentioned pair of side plates contact one another over a substantial distance outwardly from said hub, and the means for holding said last mentioned side plates in contact includes means spaced outwardly from said hub.

6. A step pulley as set forth in claim 4 wherein the second mentioned pair of side plates contact one another over only a short radial distance and are held in contact by a peened over section on the end of said hub.

7. A step pulley comprising a central hub, a substantially circular sheet metal member extending outwardly from said hub adjacent one end thereof, said sheet metal member having its outer periphery lying axially beyond the end of said hub on which the member is mounted, a second sheet metal member mounted on said hub substantially at the opposite end thereof and extending radially outwardly and in an axial direction toward the first mentioned end of said hub into contact with the first mentioned sheet metal member, means for holding said sheet metal members in contact, said sheet metal members relatively diverging outwardly of the contacting areas to form a belt receiving groove, and a third sheet metal member mounted on said hub substantially at the second mentioned end thereof, the second and third sheet metal members relatively diverging to form an additional belt receiving groove.

8. A step pulley comprising a hub having an axial bore, therethrough, said hub having reduced end portions, said hub further having a flat along one side and being otherwise substantially cylindrical, a first sheet metal disc having a substantially D-shaped central aperture and fitting over one of said reduced end portions, the outer end of that reduced end portion being peened over to secure said disc in position, said disc being generally dished out and having at least one outer portion extending axially beyond the peened over reduced end portion, a second sheet metal disc having a substantially D-shaped central aperture and fitting over the opposite end of said hub, said sheet metal disc extending generally axially and outwardly of said hub into contact with the first mentioned sheet metal disc, a plurality of welds holding said discs in contact, said discs relatively diverging radially outwardly of said welds to form a belt receiving groove, a third sheet metal disc having a substantially D-shaped central aperture and fitting over the second mentioned reduced end portion of said hub and contacting said second sheet metal disc, said second and third sheet metal discs having relatively diverging sections forming a belt receiving groove, the outer extremity of the last mentioned reduced end portion being peened over to secure said second and third sheet metal discs in position, and a reenforcing washer having a D-shaped central aperture fitting over at least one of said reduced end portions and welded to at least one of said sheet metal discs.

9. A step pulley including a rotatable base member, a first substantially circular sheet material member on said base member and symmetric about the axis of rotation of said base member, a second substantially circular sheet material member on said base member and symmetric about said axis of rotation, said sheet material members contacting near their peripheries and flaring apart outwardly thereof to form a belt receiving groove, means for holding the contacting areas of said sheet material members together, a third sheet material member on said base member and symmetric about said axis, said third sheet material member and one of said first two sheet material members being in contact and flaring apart outwardly of the contacting areas to form a belt receiving groove, and means for holding the last mentioned contacting areas together, said one of the first two sheet material members forming a common part of the two belt receiving grooves.

10. A step pulley comprising a rotatable base member; a first pulley on said base member and comprising a pair of substantially circular sheet material members joined near their peripheries and diverging at their peripheries to form a belt accommodating portion, said pair of sheet material members being spaced apart near their centers and mounted on said base member at spaced apart positions thereon; and a second pulley on said base member and comprising a pair of contacting sheet material members joined to one another and diverging outwardly therefrom to form a belt accommodating portion, one of said sheet material members of said first pulley and one of said sheet material members of said second pulley being a common member.

References Cited in the file of this patent

UNITED STATES PATENTS

| 501,228 | Jantz | July 11, 1893 |
| 1,480,359 | Wood | Jan. 8, 1924 |
| 1,976,025 | Knudsen | Oct. 9, 1934 |
| 2,337,308 | Buote | Dec. 21, 1943 |
| 2,564,132 | Scott | Aug. 14, 1951 |

FOREIGN PATENTS

| 19,611 | Great Britain | 1914 |